Jan. 1, 1924 — E. SCHNEIDER — 1,479,324

ROLLER BEARING FOR CRANK SHAFTS, CONNECTING RODS, AND THE LIKE

Filed Sept. 19, 1923 — 2 Sheets-Sheet 1

Inventor:—
Eugene Schneider
By Mauro, Cameron, Lewis,
Kirkam,
Attorneys

Jan. 1, 1924. 1,479,324
E. SCHNEIDER
ROLLER BEARING FOR CRANK SHAFTS, CONNECTING RODS, AND THE LIKE
Filed Sept. 19, 1923 2 Sheets-Sheet 2
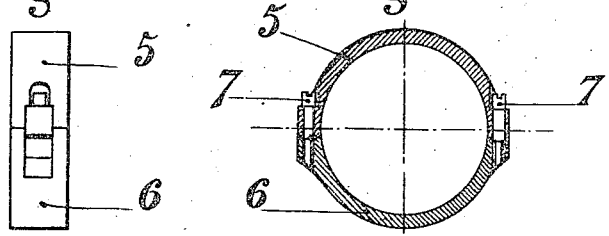
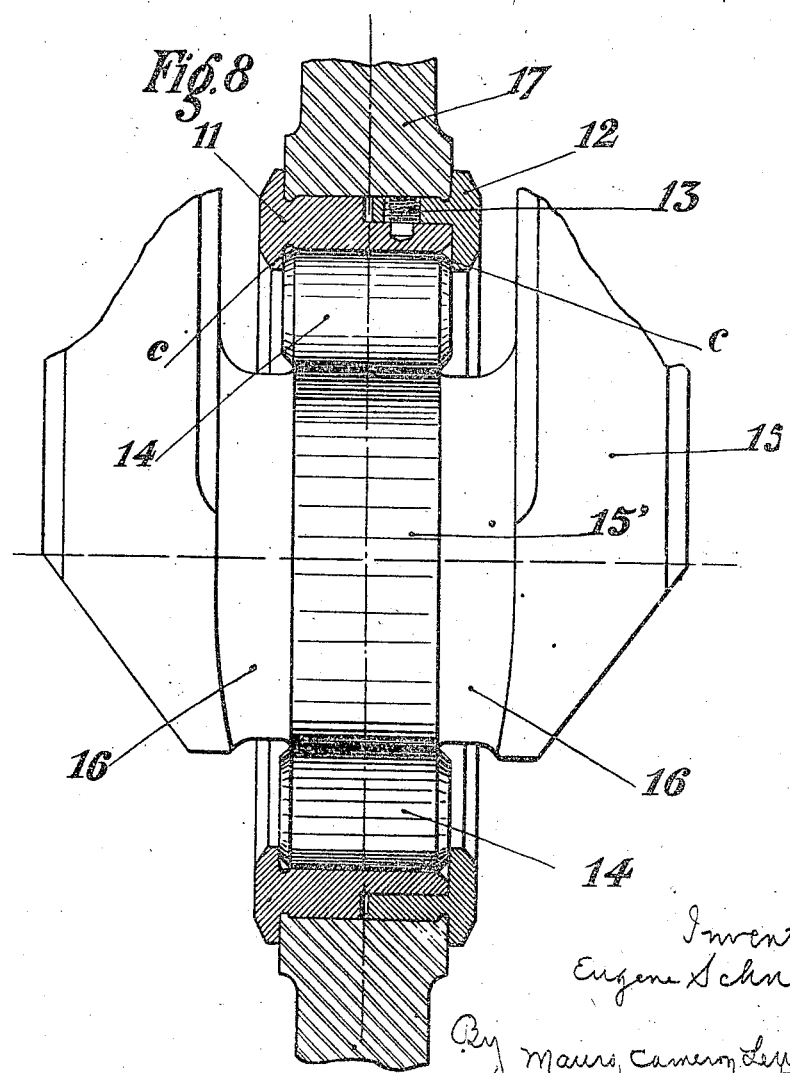

Patented Jan. 1, 1924.

1,479,324

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

ROLLER BEARING FOR CRANK SHAFTS, CONNECTING RODS, AND THE LIKE.

Application filed September 19, 1923. Serial No. 663,659.

*To all whom it may concern:*

Be it known that I, EUGÈNE SCHNEIDER, a citizen of the Republic of France, resident of Paris, France, have invented new and useful Improvements in Roller Bearings for Crank Shafts, Connecting Rods, and the like, which is fully set forth in the following specification.

This invention has for its object to provide an improved roller bearing for the big ends of connecting rods on the crank-pins of crank-shafts in internal combustion engines. With slight modifications this invention is equally applicable to the crank-shaft bearings in the crank case of such engines.

For mounting the roller bearings of crank-shaft crank-pins, one or other of the following expedients have been heretofore employed:

The crank-shaft has been made in several pieces which are fastened together, after erection, by means of keys, bolts, &c.; or the big end of the connecting rod comprises a cap which is fixed on the connecting rod proper after the latter has been placed in position on the crank-pin; or the big end of the connecting rod is made in one piece and can be slipped over the cranks of the crank-shaft which is likewise made in one piece (in this case the roller races being split diametrally), or it is necessary to provide in the crank-shaft notches designed to permit placing the rollers in position, these notches being subsequently closed by means of filling pieces designed to prevent the rollers from coming out.

The improved roller bearing of the present invention, does away with the disadvantages incident to the use of the expedients hereinbefore mentioned. The improved roller bearing provides for the mounting of a connecting rod made in one piece upon a crankshaft likewise made in one piece, and the use between the crank-pin and the big end of the connecting rod, of roller bearings having continuous roller races, without the necessity of cutting-away or notching the crank-shaft for the purpose of inserting the rollers. This improved arrangement thus affords greater facility of machining and erecting the parts, and greater strength of the assemblage.

Two constructional forms of this improved bearing are illustrated by way of example in the accompanying drawings: namely a roller bearing for the big end of the connecting rod on the crank-pin of the crank-shaft of an internal combustion engine; and a roller bearing for carrying the crankshaft in the walls of the engine crank case.

In these drawings:—

Figures 6 and 7 are respectively a side elevation and a section of the two part spacing ring (hereinafter referred to) for the two series of rollers; and Figure 8 is a section taken in a plane passing through the axis of the crank-shaft bearing in the engine crank case.

Figure 1:
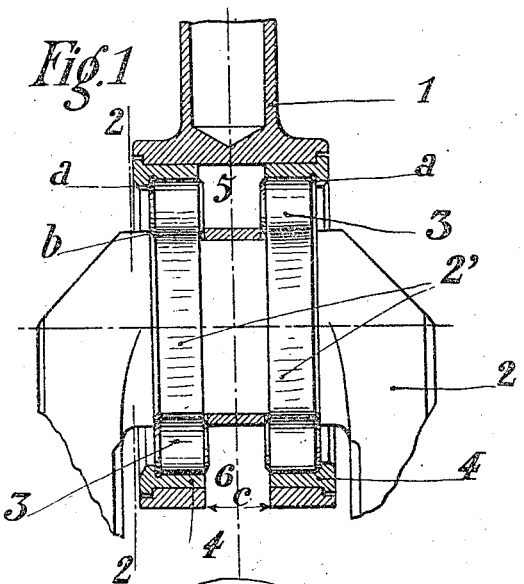
Figure 1 is a section taken in a plane passing through the axis of the crank-pin and the axis of the connecting rod, illustrating the manner of mounting the connecting rod on the crank-shaft with the interposition of rollers; the roller cage not being shown.
Figure 3:
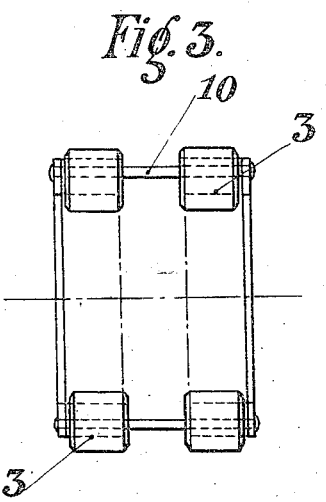
Figures 3 and 4 show the two series of rollers mounted in their cages.
Figure 2:
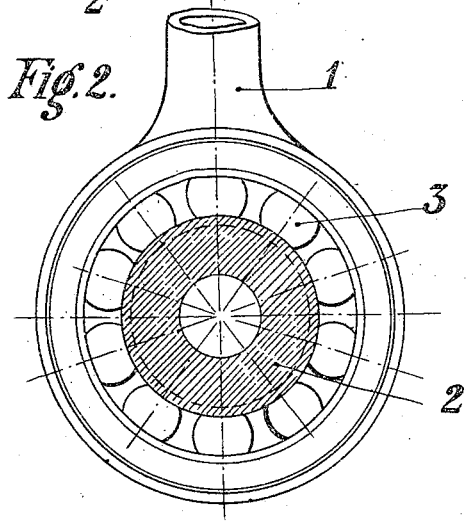
Figure 2 is a section taken along the line 2—2 of Figure 1.
Figure 4:
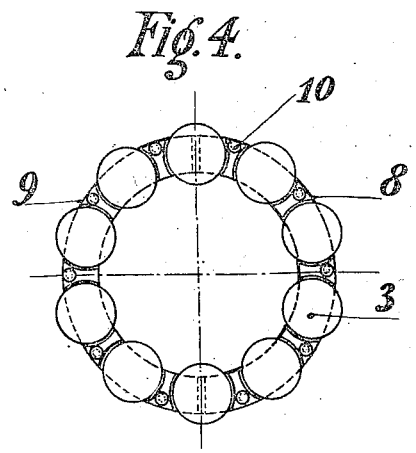

In these figures:—1 is a connecting rod and 2 is the crank-pin of the crank-shaft of an internal combustion engine. Two series of rollers 3 run directly on two inner races 2' 2' formed on the actual crank-pin, the outer races 4, 4 consisting of one-piece rings pressed into a cylindrical bore of the big end of the connecting rod and having internal diameters of sufficient size to provide for slippng the same over the crank or cranks of the crank-shaft. Shoulders $a$ of the roller races 4, 4, and shoulders $b$ of the crank-shaft serve to guide the rollers. The inner diameter of these shoulders $a$ is such as to allow the connecting rod to follow readily the cranks of the crank-shaft.

The big end of the connecting rod is notched at its lower part, and up to near a plane which, when the connecting rod is in position, passes through the axis of the crank-pin and is at right angles to the axis of the connecting rod, it is milled out for a width $c$ to permit mounting the rollers. These rollers have a length that is slightly less than one-third of the distance between the shoulders $a$. The width $c$ is greater than the length of the rollers.

When the connecting rod 1, fitted with its roller races 4, has been brought into position for assemblage, the rollers 3 are introduced one after another into their races through the notched part of the eye in the big end of the connecting rod. Then two spacing ring halves 5 and 6 are placed upon a corresponding part of the crank-pin between the two series of rollers and connected together by means of stud bolts 7 (Fig. 7). The width of these half-rings is such that the rollers shall have just the amount of 'ay required to be able to turn without excessive friction, while preventing any longitudinal displacement of the connecting rod.

The distance between the rollers of each series is maintained by means of a cage of bronze or sheet steel.

In order to facilitate the assembling, each cage is composed of two half-cages 8 and 9, and the two series of half-cages are connected by means of long rivets 10 so as to form a complete cage (Fig. 5) for the two rows of rollers. In the form shown (Fig. 5) each cage is provided with a plurality of roller receiving pockets closed at the outer end and open at the inner end.

The same principle is employed in Figure 8 for installing roller bearings in the mounting of the crank-shaft bearings in the corresponding lodgements in the crank case.

Figure 5:
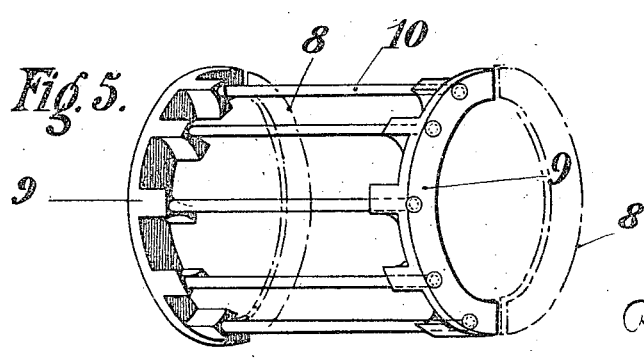
Figure 5 shows the two roller cages assembled in accordance with the present invention.

In the same manner as the assembled connecting rod and crank, the rollers 14 roll directly on an inner race 15' formed on the crank 15, and the distance between the rollers of the single series of rollers is maintained by a cage (not shown) analogous to the cage 8—9—10 shown in Figure 5. But in this arrangement instead of shoulders as abutments for the rollers, the crank-shaft is formed with wide circular grooves 16 for the purpose of allowing the longitudinal displacements. The outer roller race consists of two rings 11, 12 fastened together by stud screws 13, said rings having internal diameters of sufficient size to provide for slipping the same over the crank or cranks of the crank-shaft and the rings being formed with cheeks c for guiding the rollers.

The improved roller bearing is assembled as follows:—First the ring 11 is placed between the two webs of the crank-shaft, then the rollers are placed between their inner and outer races. The ring 12 is then moved into its position shown in Figure 8, whereupon the two rings are fitted one into the other, and the stub screws 13 are screwed in.

Then the crank shaft, with its bearing, is placed into the corresponding lodgement in the crank case wall, and the cover of the crank case is fastened on. As in the preceding arrangement, the internal diameter of the cheeks c is such as to allow the rings 11 and 12 to be readily slipped over the crank or cranks of the shaft.

Having now particularly described and ascertained the nature of our said invention and in what manner the same is to be performed, I declare that what I claim is:—

1. In a roller bearing, the combination of a crank shaft having inner roller races formed thereon, outer roller races comprising one-piece rings having internal diameters of sufficient size to provide for slipping the same into position over a crank of said shaft, and a plurality of rollers confined in rolling engagement with said inner races by said rings.

2. In a roller bearing, the combination of a crank shaft having shoulders at the ends of its crank pin, a connecting rod on said pin and having a slot in its big end, two outer races on the big end of the connecting rod and two inner races on said crank pin, two series of rollers confined in said races between said shoulders, said rollers being positioned by inserting the same through said slot, and a two part spacing ring on said shaft between the two series of rollers.

3. In a roller bearing, the combination of a crank shaft, a connecting rod on the pin of said shaft and having a slot in its b' end, two outer races on the big end of the rod and two inner races on said pin, two series of rollers in said races and positioned therein by inserting the same through the connecting rod slot, two cages in said races each made in two parts and in which said rollers are positioned, a two-part spacing ring between said series of rollers, and means for securing the two cages together after the parts have been assembled.

4. In combination, a crank shaft, a one-piece race ring encircling said shaft and having an internal diameter of sufficient size to provide for slipping the same over a crank of said shaft, and a plurality of antifriction members confined in rolling engagement with said shaft by said race ring.

5. In combination, a crank shaft having a raceway integrally formed thereon, a one-piece race ring encircling said raceway and having an internal diameter of sufficient size to provide for slipping the same over a crank of said shaft, and a plurality of antifriction members confined in rolling engagement with said raceway by said race ring.

6. In combination, a crank shaft, a one-piece race ring encircling said shaft and having an internal diameter of sufficient size to provide for slipping the same over a crank of said shaft, a cheek at one side of said race ring, and a plurality of antifriction members confined in rolling engagement with said shaft by said race ring.

7. In combination, a crank shaft, a pair of one-piece rings encircling said shaft and having internal diameters of sufficient size to provide for slipping the same over a crank of said shaft, and a plurality of antifriction members confined in rolling engagement with said shaft by said rings.

8. In combination, a crank shaft, a one-piece race ring encircling said shaft and having an internal diameter of sufficient size to provide for slipping the same over a crank of said shaft, a cage between said ring and shaft, and a plurality of antifriction members confined in said cage by said ring.

9. In combination, a crank shaft, a one-piece race ring encircling said shaft, a cage between said ring and shaft, a second ring encircling said shaft, and a plurality of antifriction members in said cage and retained in rolling engagement with the shaft by said rings.

10. In combination, a crank shaft, a one-piece race ring encircling said shaft, a two-part cage between said ring and shaft, a second ring encircling the shaft and made in two parts, and a plurality of anti-friction members in said cage retained in rolling engagement with the shaft by said rings.

11. In combination, a crank shaft, a one-piece race ring encircling said shaft, a cage between said ring and shaft and having pockets closed at one end and open at the opposite end, a plurality of antifriction members in said cage and having rolling engagement with the shaft and ring, and a second ring encircling said shaft at the open ends of said pockets.

12. In combination, a crank shaft having an inner raceway formed on its pin, an outer raceway encircling said inner raceway and having an internal diameter of sufficient size to provide for slipping the same over a crank of said shaft, a cage between said raceways, and a plurality of antifriction members in said cage and having rolling engagement with said raceways.

13. In combination, a crank shaft, a connecting rod on the pin of said shaft and having a slot in its big end, a race ring in said big end, a plurality of antifriction members confined in rolling engagement with said pin by said ring and positioned by inserting the same through said slot, and a two-part retaining ring on said pin.

14. In combination, a crank shaft, a connecting rod on the pin of said shaft and having a slot in its big end, a race ring encircling said pin, a cage between said ring and pin and having pockets closed at one end and open at the opposite end, and a plurality of antifriction members in said cage and positioned by inserting the same through said slot.

15. In combination, a crank shaft, a race ring encircling said shaft and having an internal diameter of sufficient size to provide for slipping the same over the crank of said shaft, a cage between said ring and shaft and having pockets closed at one end and open at the opposite end, and a plurality of antifriction members in said cage having rolling engagement with the ring and shaft.

16. In combination, a crank shaft, a plurality of antifriction members in rolling engagement with the pin of said shaft, and retaining means for said members comprising a shoulder at one end of the pin, a race ring encircling said members and having a retaining cheek at one side thereof, and a retaining ring encircling said pin at the opposite side of said race ring.

17. In combination, a crank shaft, a connecting rod on the pin of said shaft, a plurality of antifriction members in rolling engagement with said pin, a cage in which said rollers are positioned, and retaining means for said members comprising a shoulder at one end of the crank pin, a race ring encircling said antifriction members and having a cheek at one side thereof, said race ring being mounted on the big end of the connecting rod, and a retaining ring encircling said pin at the opposite side of said race ring.

18. In combination, a crank shaft, two outer race rings encircling said shaft and having internal diameters of sufficient size to provide for slipping the same over a crank of said shaft, two series of rollers confined in rolling engagement with said shaft by said outer race rings, two cages for said rollers, and means connecting said cages together.

19. In combination, a crank shaft, a connecting rod, on the pin of said shaft and having a slot in its big end, two spaced cages on said big end, one at each side of said slot, and a plurality of antifriction members in said cages and positioned therein from opposite directions by inserting the members through said slot.

In testimony whereof I have signed this specification.

EUGÈNE SCHNEIDER.